Nov. 13, 1956     O. L. LOWEEN     2,770,387
VANITY CASE
Filed Oct. 31, 1955                               2 Sheets-Sheet 1
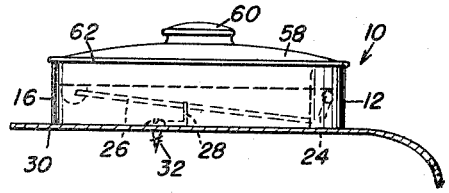
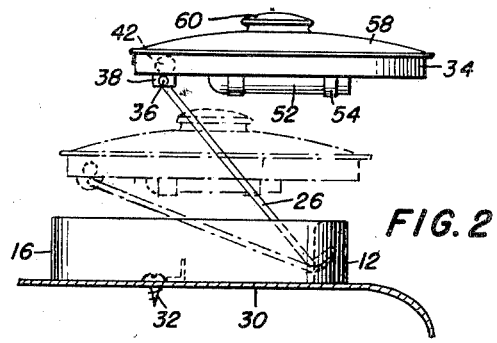
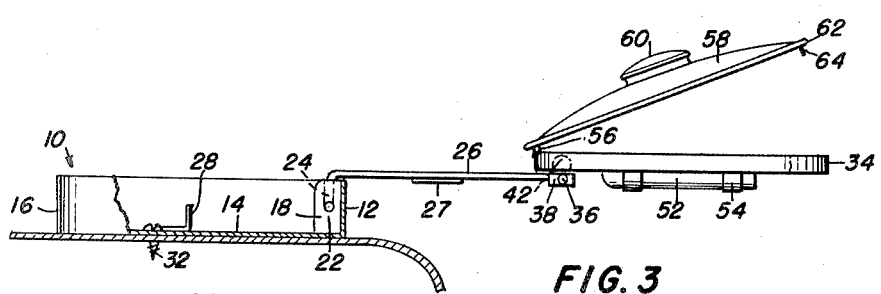
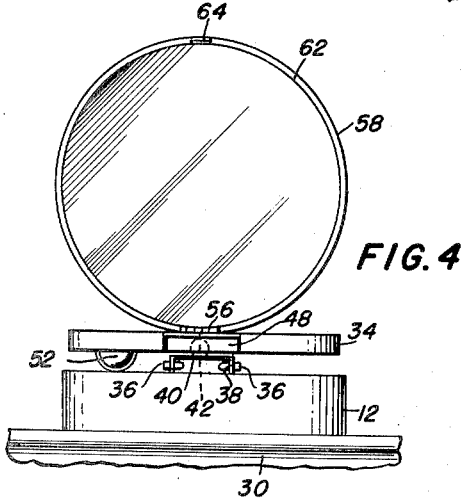
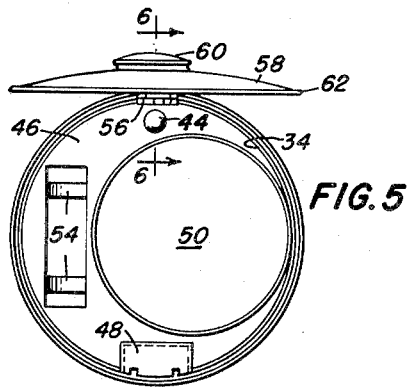
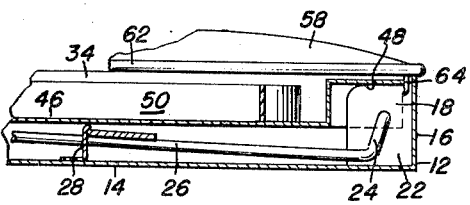
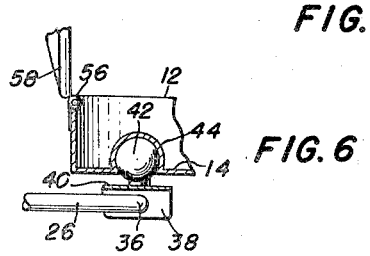
INVENTOR
OSCAR L. LOWEEN
BY Gustave Miller
ATTORNEY Nov. 13, 1956  O. L. LOWEEN  2,770,387
VANITY CASE Filed Oct. 31, 1955  2 Sheets-Sheet 2

INVENTOR
OSCAR L. LOWEEN
BY
ATTORNEY

United States Patent Office 2,770,387
Patented Nov. 13, 1956

2,770,387

VANITY CASE

Oscar L. Loween, Kalispell, Mont.

Application October 31, 1955, Serial No. 543,944

3 Claims. (Cl. 220—18)

This invention relates to a vanity case, and it particularly relates to a vanity case which is adapted to be attached within an automobile or the like.

The vanity case of the present invention may be attached to the car in either the front or rear portion thereof so that it may be used in any convenient position.

One object of the present invention is to provide a vanity case which is adapted to be permanently attached in an automobile or the like and which is, nevertheless capable of adjustment to convenient positions.

Another object of the present invention is to provide a vanity case for automobiles or the like which is simple in construction, easy to install and easy to use.

Other objects of the present invention are to provide an improved vanity case, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a side elevational view of a device embodying the present invention, shown in closed position.

Fig. 2 is a side elevational view of the device of Fig. 1, shown in partly open position.

Fig. 3 is a view, partly in section and partly in elevation, showing the device in fully open position.

Fig. 4 is a front elevational view of the device in open position.

Fig. 5 is a top plan view of the cosmetic case.

Fig. 6 is a sectional view taken on line 6—6 of Fig. 5.

Fig. 7 is a fragmentary, sectional view of the device in the closed position of Fig. 1.

Figure 8:
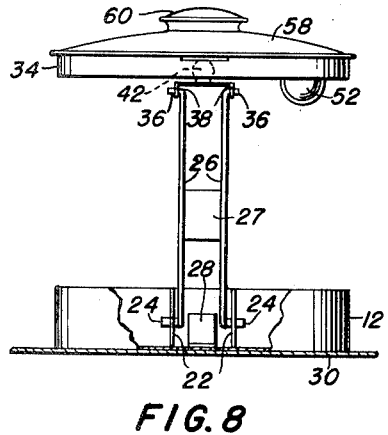
Fig. 8 is a rear elevational view of the device.

Referring now in greater detail to the drawings wherein similar reference characters refer to similar parts, there is shown a vanity case, generally designated 10, comprising a hollow base 12 which includes a bottom wall 14 and an annular side wall 16 integral therewith. At the forward end of the base, internally thereof, is provided a bracket 18 having a pair of side walls 22.

The side walls 22 of the bracket 18 are each provided with corresponding openings, through each of which is inserted a laterally offset portion 24 of each of a pair of parallel rods 26. A metal strap 27 holds the rods in spaced position. These laterally offset portions 24 coact with the openings in the bracket through which they are inserted to form a pivot for the rods 26. A spring clip 28 is provided centrally of the base to hold the rods in their retracted positions within the base.

The base 12 may be rigidly connected to either the top of the dashboard 30 or to the top of the front seat facing the rear. It may, as a matter of fact, be placed on any horizontal or vertical surface, either in or out of an automobile.

The attachment of the base 12 to the supporting surface is effected by means of screws 32 or the like. It is also possible, of course, to attach this device to any part of a house such as a bathroom shelf or in a bedroom.

Pivotally connected to the opposite ends of the rods 26 is a case 34. The pivotal connection is formed by offset portions 36 on the rods 26, these offset portions being inserted into corresponding holes in a bracket 38. The bracket 38 is provided with a top wall 40 from which upwardly extends a ball 42. This ball 42 extends into a socket 44 in the bottom wall 46 of the case 34 to form a universal ball-and-socket joint.

The front end of the bottom wall 46 of the case 34 is recessed at 48 to embrace the bracket 18 when the device is closed. A face-powder receptacle 50 and a lipstick holder 52 are also provided in the bottom wall 46. The lipstick holder depends below the bottom plane of the case, as best shown in Figs. 2, 3, and 4, and is held in place by metal straps 54. Hingedly connected to the case 34, as by hinge 56, is a cover 58 having a knob 60. This cover 58 has a beaded rim 62 which overlaps the edge of the case 34 and is adapted to overlie the top of the wall 16 of the base 12 so that when the device is in inoperative position, the cover 58 closes the entire device. A snap 64 is adapted to engage over the lip of the case to lock the cover in closed position.

At the inner surface of the cover 58 is provided a mirror 66. This mirror is in operative position whenever the case is open.

From the above description, the operation of the device is obvious. Briefly stated, when the vanity case is not in use, it is in the position shown in Fig. 1. When it is to be used, the knob 60 is grasped and the case 34 is moved upward and outward out of the base 12, the rods 26 acting as links during this pivotal movement. When the case is in the fully extended position of Fig. 3, it can be adjusted, by means of its ball-and-socket joint, to the desired position. It is then in easy reach of the woman desiring to use it.

Figure 9:
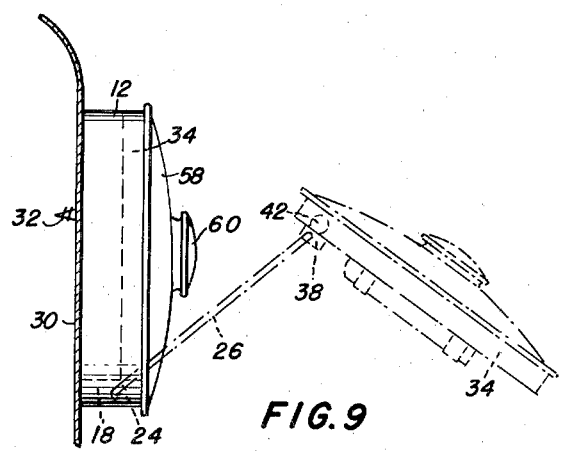
Fig. 9 is a side elevational view of the device mounted vertically, the device being shown closed in full line and partially open in dotted outline.
Figure 10:
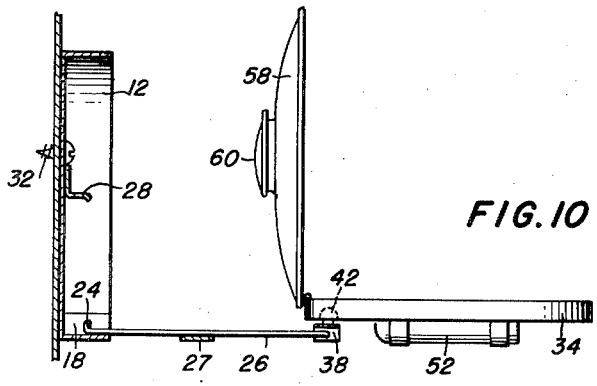
Fig. 10 is a side view of the vertically mounted device in open position, the base being shown in section and the case in elevation.
Figure 11:
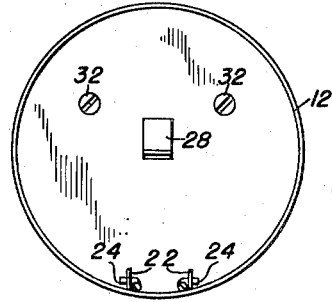
Fig. 11 is a top plan view of the base shown mounted in position.

Whether the device is mounted horizontally as in Fig. 1, or vertically as in Fig. 9, the case 34 is merely pulled out from the fixed base 12 and it is in horizontal position, ready for use.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A vanity case comprising a hollow base adapted to be permanently connected to a supporting surface, a container pivotally movable from a position within said base to a position remote therefrom, linkage connecting said container to said base for said pivotal movement, a lid hingedly connected to said container, and means to lock said lid in closed position on said container, said lid being constructed and arranged to close both said container and said base when said container is positioned within said base.

2. The vanity case of claim 1 wherein a bracket is provided within said base at one end thereof and wherein said linkage is pivotally connected at one end thereof to said bracket, the opposite end of said linkage being pivotally connected to that end of said container which is remote from said bracket when said container is positioned within said base.

3. The vanity case of claim 1 wherein a spring retainer is provided within said base to resiliently and releasably clamp said linkage in retracted position when said container is positioned within said base.

References Cited in the file of this patent

UNITED STATES PATENTS

| | | |
|---|---|---|
| 1,455,432 | Dodson | May 15, 1923 |
| 1,850,352 | McAtree | Mar. 22, 1932 |
| 2,148,557 | Hook | Feb. 28, 1939 |